United States Patent
Pierpont et al.

(10) Patent No.: US 10,361,441 B2
(45) Date of Patent: Jul. 23, 2019

(54) MEMBRANE ELECTRODE ASSEMBLY AND METHODS OF MAKING THE SAME

(71) Applicant: 3M INNOVATIVE PROPERTIES COMPANY, St. Paul, MN (US)

(72) Inventors: Daniel M. Pierpont, North Saint Paul, MN (US); Joseph W. Frisk, Oakdale, MN (US); Eric J. Hanson, Hudson, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 198 days.

(21) Appl. No.: 15/105,170

(22) PCT Filed: Dec. 10, 2014

(86) PCT No.: PCT/US2014/069475
§ 371 (c)(1),
(2) Date: Jun. 16, 2016

(87) PCT Pub. No.: WO2015/094845
PCT Pub. Date: Jun. 25, 2015

(65) Prior Publication Data
US 2016/0322651 A1  Nov. 3, 2016

Related U.S. Application Data

(60) Provisional application No. 61/917,135, filed on Dec. 17, 2013.

(51) Int. Cl.
*H01M 4/88* (2006.01)
*H01M 8/0234* (2016.01)
(Continued)

(52) U.S. Cl.
CPC ......... *H01M 8/0271* (2013.01); *H01M 4/881* (2013.01); *H01M 8/0234* (2013.01);
(Continued)

(58) Field of Classification Search
CPC ............ H01M 8/0258; H01M 8/0234; H01M 8/1004; H01M 4/88; H01M 4/881
See application file for complete search history.

(56) References Cited

U.S. PATENT DOCUMENTS 6,624,328 B1  9/2003  Guerra
7,348,088 B2  3/2008  Hamrock
(Continued)

FOREIGN PATENT DOCUMENTS

EP  1921701  5/2008
EP  2800180  11/2014
(Continued)

OTHER PUBLICATIONS

International Search Report for PCT International Application No. PCT/US2014/069475, dated Feb. 10, 2015, 4 pages.

*Primary Examiner* — Karie O'Neill Apicella
(74) *Attorney, Agent, or Firm* — Thomas M. Spielbauer (57) ABSTRACT

Membrane electrode assembly comprising a first gas diffusion layer having a first microporous layer on a major surface thereof, wherein the first microporous layer has a major surface, wherein the major surface of the first microporous layer has discontinuous areas therein substantially free of microporous material, and wherein at least a portion of the first discontinuous areas has adhesive therein; and methods for making the same. Membrane electrode assemblies described herein are useful, for example, in fuel cells.

5 Claims, 3 Drawing Sheets

(51) Int. Cl.
*H01M 8/0258* (2016.01)
*H01M 8/1004* (2016.01)
*H01M 8/0271* (2016.01)
*H01M 8/0247* (2016.01)

(52) U.S. Cl.
CPC ....... *H01M 8/0247* (2013.01); *H01M 8/0258* (2013.01); *H01M 8/1004* (2013.01)

(56) References Cited

U.S. PATENT DOCUMENTS

| | | |
|---|---|---|
| 2005/0064275 A1 | 3/2005 | Mekala |
| 2007/0190401 A1 | 8/2007 | Ueda |
| 2008/0113241 A1* | 5/2008 | Berning ............ H01M 8/0234 429/450 |
| 2008/0145712 A1 | 6/2008 | Pierpont |
| 2008/0206615 A1 | 8/2008 | Nicotera |
| 2009/0246565 A1* | 10/2009 | Hongo ................ H01M 8/023 429/442 |
| 2010/0000679 A1 | 1/2010 | Han |
| 2011/0287183 A1 | 11/2011 | Sung |
| 2012/0288618 A1 | 11/2012 | Yamamoto |
| 2014/0329164 A1 | 11/2014 | Utsunomiya |

FOREIGN PATENT DOCUMENTS

| | | |
|---|---|---|
| WO | WO 2004/086542 | 10/2004 |
| WO | WO 2005/020356 | 3/2005 |
| WO | WO 2005/029620 | 3/2005 |
| WO | WO 2006/022758 | 3/2006 |
| WO | WO 2006/065365 | 6/2006 |
| WO | WO 2007/088049 | 8/2007 |
| WO | WO 2009/040571 | 4/2009 |
| WO | WO 2013/099720 | 7/2013 |
| WO | WO 2015/095021 | 6/2015 |

* cited by examiner

FIG. 3B

MEMBRANE ELECTRODE ASSEMBLY AND METHODS OF MAKING THE SAME

CROSS REFERENCE TO RELATED APPLICATIONS

This application is a national stage filing under 35 U.S.C. 371 of PCT/US2014/069475, filed Dec. 10, 2014, which claims the benefit of U.S. Provisional Application No. 61/917,135, filed Dec. 17, 2013, the disclosure of which is incorporated by reference in its/their entirety herein.

BACKGROUND

Fuel cell membrane electrode assemblies (MEAs) typically include carbon paper gas diffusion layers (GDLs) bonded to, coated on, or laminated to the anode and cathode catalysts and membrane layers. The five-layer construction can be made in several ways, however often the catalysts are attached to the membrane to form a catalyst coated membrane (CCM). The was diffusion layers with micro porous layer (MPL) are then attached to the catalyst coated membrane to form the membrane electrode assembly.

Often the bond between the catalyst and microporous layer side of the gas diffusion layer is a weak spot in the construction in terms of desirably securing the gas diffusion layer and catalyst coated membrane together. Furthermore, even if the bond between the microporous layer and catalyst is relatively strong it is also possible that the bond between the microporous layer and gas diffusion layer fibers is not adequate to hold together the components. For this reason, it can be advantageous to adhesively bond the gas diffusion layer to the catalyst coated membrane in such a manner that the adhesive is touching the gas diffusion layer carbon fibers and thusly creating a strong bond.

SUMMARY

In one aspect, the present disclosure describes a membrane electrode assembly comprising a first gas diffusion layer having a first microporous layer on a major surface thereof, wherein the first microporous layer has a major surface, wherein the major surface of the first microporous layer has discontinuous areas therein substantially free of microporous material, and wherein at least a portion of the first discontinuous areas have adhesive therein. "Substantially free of microporous material" as used herein refers to at least a portion of a discontinuous area not having microporous material on the applicable major surface of the gas diffusion layer.

In another aspect, the present disclosure describes a first method of making a membrane electrode assembly, the method comprising:

providing a first gas diffusion layer having a first microporous layer on a major surface thereof, wherein the first microporous layer has a major surface area;

removing a portion of the first microporous layer from the first gas diffusion layer to provide at least a first area on the major surface of the first gas diffusion layer substantially free of first microporous material;

providing a catalyst coated membrane having first and second generally opposed major surfaces, wherein the first major surface comprises an anode catalyst, and wherein the second major surface comprises a cathode catalyst;

securing the first gas diffusion layer to the anode catalyst of the catalyst coated membrane, wherein there is a first adhesive disposed in at least a portion of the first area of the first gas diffusion layer substantially free of first microporous material that at least partially aids in bonding the first gas diffusion layer and the catalyst coated membrane together; and securing a second gas diffusion layer to the cathode catalyst of the catalyst coated membrane to provide the membrane electrode assembly.

In another aspect, the present disclosure describes a second method of making a membrane electrode assembly, the method comprising:

coating a microporous layer onto a first gas diffusion layer on a major surface thereof using at least one mask to provide a first gas diffusion layer having a first microporous layer on a major surface thereof, wherein the first microporous layer has a major surface, and wherein the major surface of the first microporous layer has discontinuous areas therein substantially free of first microporous material, and wherein at least a portion of at least one discontinuous area is in an active area of the first gas diffusion layer;

providing a catalyst coated membrane having first and second generally opposed major surfaces, wherein the first major surface comprises an anode catalyst, and wherein the second major surface comprises a cathode catalyst;

securing the first gas diffusion layer to the anode catalyst of the catalyst coated membrane, wherein there is a first adhesive disposed in at least a portion of the discontinuous areas of the first gas diffusion layer substantially free of first microporous material that at least partially aids in bonding the first gas diffusion layer and the catalyst coated membrane together; and securing a second gas diffusion layer to the cathode catalyst of the catalyst coated membrane to provide the membrane electrode assembly.

Membrane electrode assemblies described herein are useful, for example, in fuel cells. Advantages of embodiments of membrane electrode assemblies described herein include good handle ability such that the components are generally held together well and do not need to be assembled into the fuel cell stack separately. Adhesively bonding the gas diffusion layer can improve alignment of the gas diffusion layer to the active area as well as aid in having this alignment retained within the stack. It is also advantageous for stack makers to be supplied fully integrated membrane electrode assemblies as opposed to individual components, for speed in stack building.

DETAILED DESCRIPTION

Figure 1:
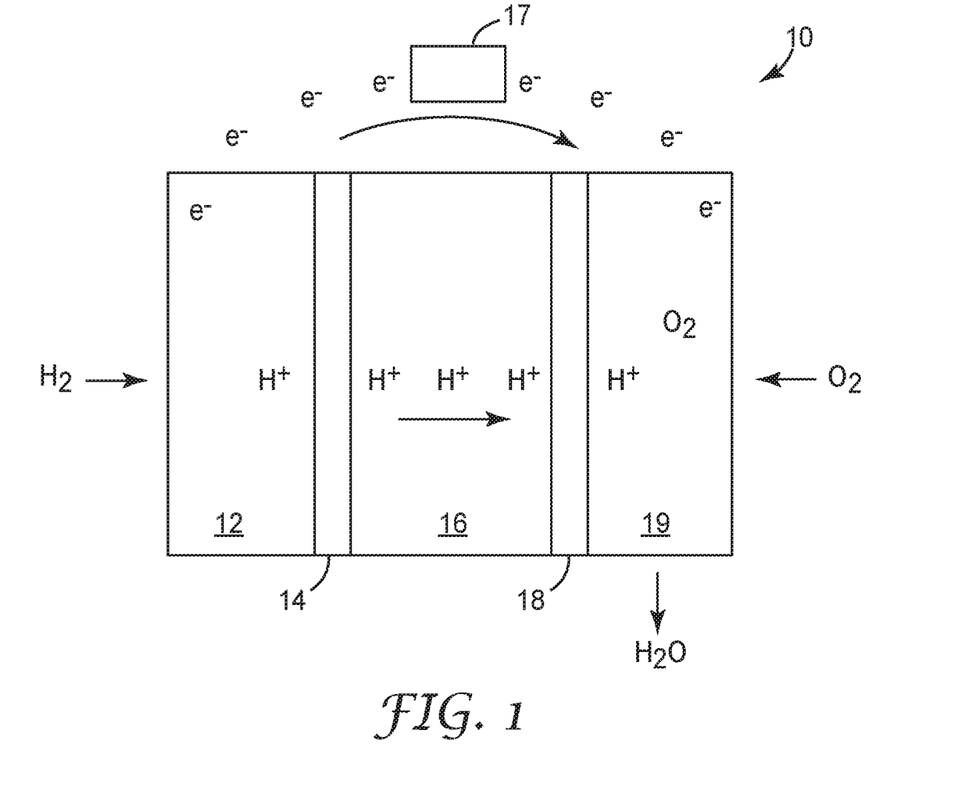
FIG. 1 is an illustration of an exemplary fuel cell including an article described herein.

Referring to FIG. 1, fuel cell 10 includes an exemplary membrane electrode assembly described herein 9. Membrane electrode assembly 9 first gas diffusion layer (GDL)

12 is adjacent anode 14. Adjacent anode 14 is electrolyte membrane 16. Cathode 18 is adjacent electrolyte membrane 16, and second gas diffusion layer 19 is adjacent the cathode 18. GDLs 12 and 19 can be referred to as diffuse current collectors (DCCs) or fluid transport layers (FTLs). In operation, hydrogen fuel is introduced into the anode portion of fuel cell 10, passing through first gas diffusion layer 12 and over anode 14. At anode 14, the hydrogen fuel is separated into hydrogen ions ($H^+$) and electrons ($e^-$).

Electrolyte membrane 16 permits only the hydrogen ions or protons to pass through electrolyte membrane 16 to the cathode portion of fuel cell 10. The electrons cannot pass through electrolyte membrane 16 and, instead, flow through an external electrical circuit in the form of electric current. This current can power, for example, electric load 17, such as an electric motor, or be directed to an energy storage device, such as a rechargeable battery.

Oxygen flows into the cathode side of fuel cell 10 via second gas diffusion layer 19. As the oxygen passes over cathode 18, oxygen, protons, and electrons combine to produce water and heat.

Figure 2:
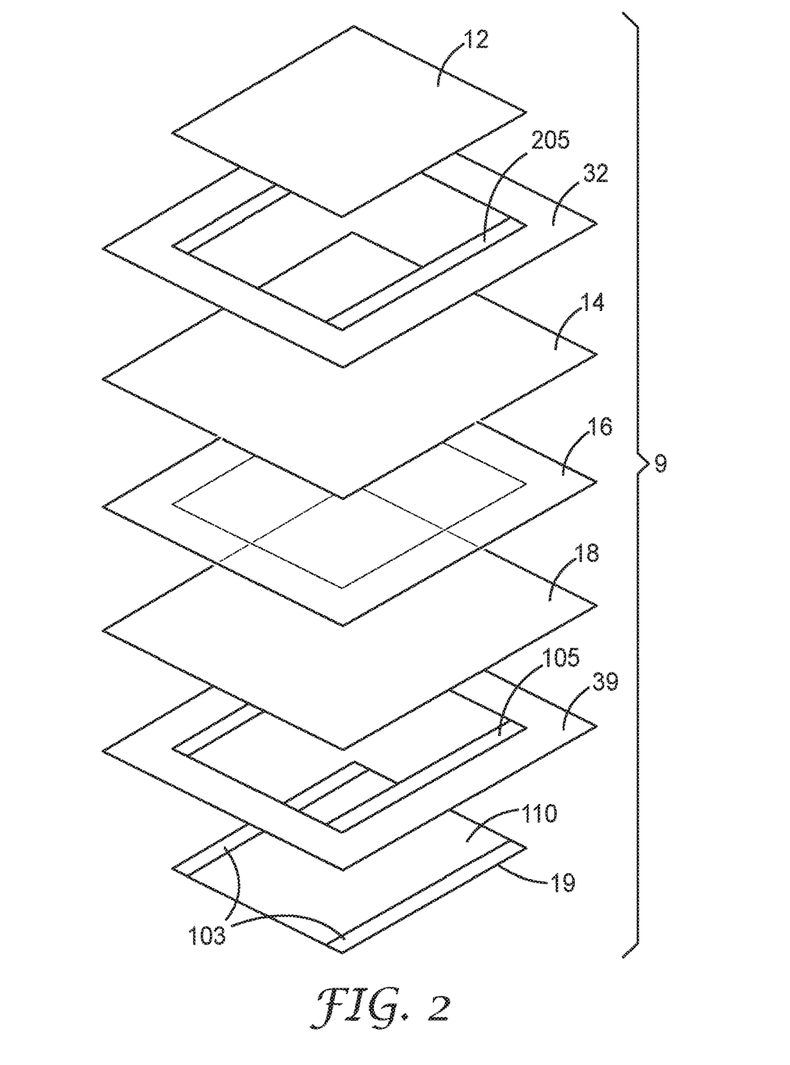
FIG. 2 is an exploded view of an exemplary membrane electrode assembly described herein, as included in the fuel cell shown in FIG. 1.
Figure 2A:
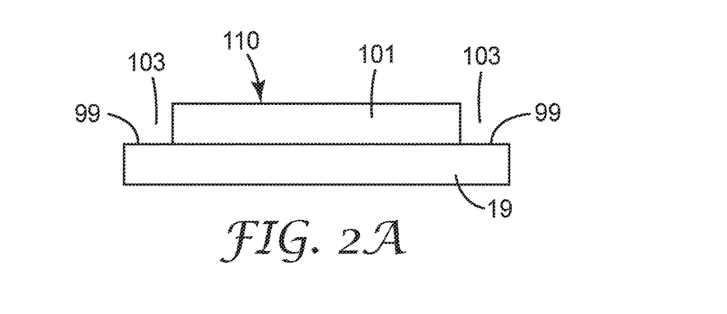
FIG. 2A is a cross-sectional view of a gas diffusion layer shown in FIG. 2.

FIGS. 2 and 2A provides some further details of exemplary membrane electrode assembly described herein 9. Membrane electrode assembly described herein 9 comprises second gas diffusion layer 19 having first microporous layer 101 on major surface thereof 99. First microporous layer 101 has major surface 110. Major surface 110 of first microporous layer 101 has discontinuous areas therein 103 substantially free of microporous material. At least a portion of first discontinuous areas 103 has adhesive 105 therein. Adhesive 105 may be applied to major surface 99 of second gas diffusion layer 19 after having already been attached or adhered to a subgasket 39. Similarly, adhesive 205 may be applied to first gas diffusion layer 12 after having already been adhered to a subgasket 32. In some embodiments, for example, as illustrated here, at least a portion of at least one discontinuous area 103 is in an active area. Optionally, there is also provided a first gas diffusion layer 12 having on its underside in FIG. 2A second microporous layer (not shown) that has discontinuous areas therein substantially free of microporous material. In some embodiments, for example, as illustrated here, at least a portion of second discontinuous areas has adhesive 205 therein. In some embodiments, for example, as illustrated here, at least a portion of at least one discontinuous area 203 is in an active area. "Active area" as used herein refers to an area in the gas diffusion layer where a major surface of the gas diffusion layer is adjacent to the catalyst surface available for electrochemical fuel cell reactions to take place.

Although FIG. 2 shows an exemplary diffusion layer having the discontinuous areas thereon secured to the anode catalyst of the catalyst coated membrane, and a gas diffusion layer which may or may not have the discontinuous areas thereon secured to the cathode catalyst of the catalyst coated membrane, other exemplary embodiments of membrane electrode assemblies described herein have a gas diffusion layer having the discontinuous areas thereon secured to the cathode catalyst of the catalyst coated membrane, and a gas diffusion layer which may or may not have the discontinuous areas thereon secured to the anode catalyst of the catalyst coated membrane.

In some embodiments, the discontinuous areas of a gas diffusion layer microporous membrane are a plurality of channels. In some embodiments, at least a portion of the discontinuous areas substantially free of microporous material are a plurality of unconnected channels. In some embodiments, at least a portion of the discontinuous areas substantially free of microporous material are a plurality of connected channels. In some embodiments, at least a portion of the discontinuous areas are in the form of a pattern.

In some embodiments, at least some of the discontinuous areas have a width in a range from 1 mm to 10 mm (in some embodiments in a range from 2 mm to 6 mm, or even 3 mm to 5 mm).

In some embodiments, the first discontinuous areas substantially free of microporous material associated with a microporous layer are collectively in a range of 2% to 40% (in some embodiments, 4% to 20%, or even 6% to 15%) of the major surface of the microporous layer.

Suitable gas diffusion layers and or methods of making the layers are known in the art, or can be modified as described herein, to make membrane electrode assemblies described herein. Typically, the gas diffusion layer comprises sheet material comprising carbon fibers. Typically, the gas diffusion layer is a carbon fiber material in the form of woven or non-woven carbon fibers. Exemplary carbon fibers are commercially available, for example, under the trade designations "TORAY CARBON PAPER" from Toray Industries from Chuo-ku, Japan; "ZOLTEKCARBON CLOTH PANEX 30" from Zoltek Corporation, St. Louis, Mo.; and "FREUDENBERG GAS DIFFUSION LAYERS" from Freudenberg FCCT Se & Co. Kg., Weinheim, Germany. Optionally the gas diffusion layer may be coated or impregnated with various materials, including carbon particle coatings, hydrophilizing treatments, and hydrophobizing treatments (e.g., coating with polytetrafluoroethylene (PTFE)).

The microporous layers typically comprise carbon particles and a polymeric composition. Suitable carbon particles are known in the art. Exemplary carbon particles include primary particles (average sizes ranging from about 1 nanometer (nm) to about 100 nm), primary aggregates of primary particles (average sizes ranging from about 0.01 micrometer to about 1 micrometer), secondary aggregates of primary aggregates (average sizes ranging from 0.1 micrometer to about 10 micrometers), agglomerates of aggregates (average sizes greater than about 10 micrometers), and combinations thereof. In some embodiments, the carbon particles include primary particles, primary aggregates, and combinations thereof.

Suitable carbon particles are known in the art and include carbon black (e.g., oil-furnace carbon black (commercially available, for example, under the trade designation "VULCAN XC-72 CARBON BLACK" from Cabot Corporation, Billerica, Mass.). Graphitized carbon particles are also desirable, as they generally exhibit good stability versus oxidation.

Exemplary polymeric compositions for the microporous layers are known in the art and include combinations of highly-fluorinated polymers that are non-melt processable and highly-fluorinated polymers that are melt processable. In some embodiments, the non-melt processable polymers and the melt processable polymers are each perfluoropolymers.

Exemplary non-melt processable polymers include highly-fluorinated polymers that exhibit melt flow indices of less than about 0.5 gram/10 minutes (e.g., homopolymers of tetrafluoroethylene (TFE), copolymers of TFE and other monomers, and combinations thereof). Copolymers of TFE and perfluoroalkylvinylethers are typically referred to as "modified PTFE" or "TFM" (commercially available, for example, under the trade designation "DYNEON TFM" from Dyneon, LLC, Oakdale, Minn.). An example of a suitable monomer for use with TFE in the copolymer includes perfluoropropylvinylether.

Exemplary melt processable polymers include highly-fluorinated polymers that exhibit melt flow indices of at least about one gram/10 minutes (e.g., highly-fluorinated polymers include perfluoroalkoxyalkanes (PFA) (e.g., copolymers of TFE and perfluoroalkoxyvinylethers), fluorinated Ethylene Propylene (FEP), perfluoroalkyl acrylates, hexafluoropropylene copolymers, terpolymers of tetrafluoroethylene/hexafluoropropylene/vinylidene fluoride (THV), copolymers of TFE and ethylene (ETFE), perfluoropolymers thereof, and combinations thereof).

A microporous layer may be applied to the gas diffusion layer using techniques known in the art, including coating an aqueous suspension to a major surface of the gas diffusion layer. Suitable aqueous suspensions are known in the art and typically comprise a carrier, a surfactant, the carbon particles, and the polymeric composition. Exemplary carriers include water, alcohols, and combinations thereof. Exemplary surfactants include surfactants capable of substantially dispersing or suspending the carbon particles and the polymeric composition in the carrier. In some embodiments, the aqueous suspension may also include other materials, such as thickening agents, defoaming agents, emulsifiers, and stabilizers.

The concentrations of the carrier, the surfactant, the carbon particles, and the polymeric composition may vary depending on the components selected. Examples of suitable compositional concentrations of the aqueous suspension include compositions in a range from about 0.1% to about 15% surfactant, about 1% to about 50% carbon particles, and about 0.1% to about 15% polymeric composition, by weight, based on the total weight of the aqueous suspension. Suitable concentrations of the carrier are correspondingly the concentration differences between the aqueous suspension and the sum of the above-listed components.

The aqueous suspension may be coated using a variety of methods known in the art, including hand methods, machine methods, hand brushing, notch bar coating, wire-wound rod coating, fluid bearing coating, slot-fed knife coating, and three-roll coating. The coating may be achieved in one pass or in multiple passes.

After the aqueous suspension is coated on a gas diffusion layer, it may initially be heated to sufficient temperatures and durations to substantially remove the carrier, the surfactant, and decomposition products of the surfactant. After the initial heating, the microporous layer substantially retains the relative concentrations of the carbon particles and the polymeric composition as provided in the aqueous suspension. Exemplary compositional concentrations in a microporous layer (following the initial heating) include compositions in a range from about 50% to about 90% (in some embodiments, about 75% to about 85%) carbon particles, and from about 10% to about 50% (in some embodiments, about 15% to about 25%) polymeric composition, by weight, based on the total weight of the given microporous layer.

After the initial heating, a second heating step may then be used to sinter the polymeric composition. Examples of suitable sintering temperatures and durations include temperatures and durations capable of sintering the non-melt processable polymers and the melt processable polymers (e.g., about 330° C. for PTFE).

For the second method described herein gas diffusion layers having the discontinuous areas (including more than one discontinuous area (e.g., a second area; a second area and a third area; a second area, third area, and a fourth area, etc.)) on a gas diffusion layer can be made using masks when coating (including casting) the microporous layer. The mask can be used to prevent the desired portion(s) of the gas diffusion layer (e.g., the outer peripheral edge of the gas diffusion layer) from being coated with the microporous layer material. Typically, the mask leaves in a range from 4% to 12% (in some embodiments, in a range from 6% to 10%) by area of uncoated microporous layer at the peripheral edges of the gas diffusion layer. More typically it would leave uncoated at the peripheral edge.

For the first method described herein a portion(s) of a microporous layer on a gas diffusion layer can be removed, for example, via at least one of mechanical removal (e.g., machining and adhesive removal) or laser ablation. Laser ablation can be completed by concentrating energy with enough strength to remove microporous layer down to the gas diffusion layer fibers. Typically, the ablation may remove microporous layer down to the fibers at the peripheral edges reducing the area covered by the microporous layer by 2% to 40% (in some embodiments, 4% to 20%, or even 6% to 15%) of the major surface of the microporous layer. Removal of the microporous layer by adhesive can also be performed. In this case applying an adhesive or adhesive tape to the peripheral edges of the gas diffusion layer and then removing the adhesive or adhesive tape will remove microporous layer down to the fibers at the peripheral edges, reducing the area covered by the microporous layer by 2% to 40% (in some embodiments, 4% to 20%, or even 6% to 15%) of the major surface of the microporous layer. A suitable adhesive is, for example, a pressure sensitive adhesive such as that available under the trade designation "SCOTCH ATG ADHESIVE TRANSFER TAPE #924" from 3M Company, St. Paul, Minn. In some embodiments, microporous layer material is removed from at least one additional area (e.g., a second area; a second area and a third area; a second area, third area, and a fourth area, etc.) on the major surface of the gas diffusion layer.

Suitable catalyst coated membranes (CCMs) comprising anode and cathode catalyst layers and a polymer electrolyte membrane (PEM) are known in the art and can be made using techniques known in the art, including laminating, roll bonding, screen printing, or pressing, of catalyst onto the polymer electrolyte membrane.

Suitable polymer electrolyte membranes are known in the art, and typically comprise polymer electrolytes bearing anionic functional groups bound to a common backbone, which are typically sulfonic acid groups but may also include carboxylic acid groups, imide groups, amide groups, or other acidic functional groups. In some embodiments, the polymer electrolytes are highly fluorinated (e.g., perfluorinated). In some embodiments, the polymer electrolytes are copolymers of tetrafluoroethylene and at least one fluorinated, acid-functional co-monomer. Polymer electrolytes are commercially available, for example, under the trade designations "NAFION" from DuPont Chemicals, Wilmington Del.) and "FLEMION" from Asahi Glass Co. Ltd., Tokyo, Japan. In some embodiments, the polymer electrolyte is a copolymer of tetrafluoroethylene (TFE) and $FSO_2$—$CF_2CF_2CF_2CF_2$—O—CF=$CF_2$ as described, for example, in U.S. Pat. No. 6,624,328 (Guerra) and U.S. Pat. No. 7,348,088 (Hamrock et al.) and U.S. Pat. Pub. Nos. US 2004-0116742 A1, published Dec. 17, 2004, the disclosures of which are incorporated herein by reference. Typically, the polymer has an equivalent weight (EW) of no greater than 1200 (in some embodiments, no greater than 1100, 1000, 900, or even no greater than 800).

The polymer can be formed into a membrane by techniques known in the art, including casting from a suspension (e.g., bar coating, spray coating, slit coating, and brush coating). Other techniques for forming the polymer into the membrane include melt processing (e.g., via extrusion) a neat polymer. After forming, the membrane may be annealed, typically at a temperature of at least 120° C. (in some embodiments, at least 130° C., or even at least 150° C.). Typically, the polymer electrolyte membrane has a thickness not greater than 50 micrometers (in some embodiments, not greater than 40 micrometers, not greater than 30 micrometers, or even not greater than 15 micrometers).

In some embodiments, the polymer electrolyte membrane further comprises a porous support, such as a layer of expanded PTFE, where the pores of the porous support contain the polymer electrolyte. In some embodiments, the polymer electrolyte membrane has no porous support. In some embodiments, the polymer electrolyte membrane further comprises a crosslinked polymer.

Suitable catalyst coated membranes are known in the art. In some embodiments, carbon-supported catalyst particles are used. Typical carbon-supported catalyst particles are 50-90% carbon and 10-50% catalyst metal by weight, wherein the catalyst metal typically comprises Pt for the cathode and Pt and Ru in a weight ratio of 2:1 for the anode. Typically, the catalyst is applied to the polymer electrolyte membrane or to the gas diffusion layer in the form of a catalyst ink. Alternately, for example, the catalyst ink may be applied to a transfer substrate, dried, and thereafter applied to the polymer electrolyte membrane or to the gas diffusion layer as a decal. The catalyst ink typically comprises polymer electrolyte material, which may or may not be the same polymer electrolyte material that comprises the polymer electrolyte membrane. The catalyst ink typically comprises a dispersion of catalyst particles in a dispersion of the polymer electrolyte. The ink typically contains 5-30% solids (i.e., polymer and catalyst) and more typically 10-20% solids. The electrolyte dispersion is typically an aqueous dispersion, which may additionally contain alcohols and polyalcohols (e.g., glycerin and ethylene glycol). The water, alcohol, and polyalcohol content may be adjusted to alter rheological properties of the ink. In some embodiments, the ink typically contains 0-50% alcohol and 0-20% polyalcohol. In some embodiments, the ink may contain 0-2% of a suitable dispersant. The ink can be made, for example, by stirring with heat followed by dilution to a coatable consistency. Ink can be coated, for example, onto a liner or the membrane itself by both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Membrane electrode assemblies can be assembled using techniques known in the art, including attaching the gas diffusion layers to either side of a catalyst coated membrane by adhering them using an adhesive.

Exemplary adhesives include ones that will not contaminate the fuel cell (e.g., acrylates or thermal adhesives (e.g., ethylene vinyl acetate or ethylene ethyl acrylate)).

The gas diffusion layer can be attached, for example, by pressure or a combination of pressure and temperature in a press or nip for roll attachment. In some embodiments, the second gas diffusion layer is secured to the catalyst coated membrane before the first gas diffusion layer is secured to the catalyst coated membrane.

In use, membrane electrode assemblies described herein are typically sandwiched between two rigid plates, known as distribution plates, also known as bipolar plates (BPP's) or monopolar plates. Like the gas diffusion layer, the distribution plate must be electrically conductive. The distribution plate is typically made of a carbon composite, metal, or plated metal material. The distribution plate distributes reactant or product fluids to and from the membrane electrode assembly electrode surfaces, typically through at least one fluid-conducting channel engraved, milled, molded, or stamped in the surface(s) facing the membrane electrode assembly. These channels are sometimes designated a flow field. The distribution plate may distribute fluids to and from two consecutive membrane electrode assemblies in a stack, with one face directing fuel to the anode of the first membrane electrode assembly while the other face directs oxidant to the cathode of the next membrane electrode assembly (and removes product water), hence the term "bipolar plate." Alternately, for example, the distribution plate may have channels on one side only, to distribute fluids to or from a membrane electrode assembly on only that side, which may be termed a "monopolar plate." The term bipolar plate, as used in the art, typically encompasses monopolar plates as well. A typical fuel cell stack comprises a number of membrane electrode assemblies stacked alternately with bipolar plates.

Membrane electrode assemblies described herein are useful, for example, in fuel cells.

Exemplary Embodiments

1A. A membrane electrode assembly comprising a first gas diffusion layer having a first microporous layer on a major surface thereof, wherein the first microporous layer has a major surface, wherein the major surface of the first microporous layer has discontinuous areas therein substantially free of microporous material, and wherein at least a portion of the first discontinuous areas have adhesive therein.

2A. The membrane electrode assembly of Exemplary Embodiment 1A, wherein at least a portion of the first discontinuous areas substantially free of microporous material are a plurality of channels.

3A. The membrane electrode assembly of Exemplary Embodiment 1A, wherein at least a portion of the first discontinuous areas substantially free of microporous material is a plurality of unconnected channels.

4A. The membrane electrode assembly of Exemplary Embodiment 1A, wherein at least a portion of the first discontinuous areas substantially free of microporous material is a plurality of connected channels.

5A. The membrane electrode assembly of any preceding Exemplary Embodiment A, wherein at least a portion of the second discontinuous areas substantially free of microporous material is in the form of a pattern.

6A. The membrane electrode assembly of any preceding Exemplary Embodiment A, wherein at least some of the first discontinuous areas have a width in a range from 1 mm to 10 mm (in some embodiments in a range from 2 mm to 6 mm, or even 3 mm to 5 mm).

7A. The membrane electrode assembly of any preceding Exemplary Embodiment A, wherein the first discontinuous areas substantially free of microporous material are collectively in a range of 2% to 40% (in some embodiments, 4% to 20%, or even 6% to 15%) of the major surface of the microporous layer.

8A. The membrane electrode assembly of any preceding Exemplary Embodiment A, further comprising a second gas diffusion layer having a second microporous layer on a major surface thereof, wherein the second microporous layer has a major surface, and wherein the major surface of the second microporous layer has discontinuous areas therein substantially free of microporous material.

9A. The membrane electrode assembly of Exemplary Embodiment 8A, wherein at least a portion of the second discontinuous areas substantially free of microporous material is a plurality of channels.

10A. The membrane electrode assembly of Exemplary Embodiment 8A, wherein at least a portion of the second discontinuous areas substantially free of microporous material is a plurality of unconnected channels.

11A. The membrane electrode assembly of Exemplary Embodiment 8A, wherein at least a portion of the second discontinuous areas substantially free of microporous material is a plurality of connected channels.

12A. The membrane electrode assembly of any of Exemplary Embodiments 8A to 11A, wherein at least a portion of the second discontinuous areas substantially free of microporous material is in the form of a pattern.

13A. The membrane electrode assembly of any of Exemplary Embodiments 7A to 11A, wherein at least a some of the second discontinuous areas have a width in a range from 1 mm to 10 mm (in some embodiments in a range from 2 mm to 6 mm, or even 3 mm to 5 mm).

14A. The membrane electrode assembly of any of Exemplary Embodiments 7A to 13A, wherein the second discontinuous areas substantially free of microporous material are collectively in a range of 2% to 40% (in some embodiments, 4% to 20%, or even 6% to 15%) of the major surface of the microporous layer.

1B. A method of making a membrane electrode assembly, the method comprising:
  providing a first gas diffusion layer having a first microporous layer on a major surface thereof, wherein the first microporous layer has a major surface area;
  removing a portion of the first microporous layer from the first gas diffusion layer to provide at least a first area on the major surface of the first gas diffusion layer substantially free of first microporous material;
  providing a catalyst coated membrane having first and second generally opposed major surfaces, wherein the first major surface comprises an anode catalyst, and wherein the second major surface comprises a cathode catalyst;
  securing the first gas diffusion layer to the anode catalyst of the catalyst coated membrane, wherein there is a first adhesive disposed in at least a portion of at least the first area of the first gas diffusion layer substantially free of first microporous material that at least partially aids in bonding the first gas diffusion layer and the catalyst coated membrane together; and
  securing a second gas diffusion layer to the cathode catalyst of the catalyst coated membrane
to provide the membrane electrode assembly.

2B. The method of Exemplary Embodiment 1B, wherein the second gas diffusion layer is secured to the cathode catalyst of the catalyst coated membrane before the first gas diffusion layer is secured to the anode catalyst of the catalyst coated membrane.

3B. The method of either Exemplary Embodiment 1B or 2B, wherein removing the portion of the first microporous material from the first gas diffusion layer is done via at least one of laser ablation or mechanical removal.

4B. The method of either Exemplary Embodiment 1B or 2B, wherein removing the portion of the first microporous material from the first gas diffusion layer is done via at least one of laser ablation or adhesive transfer.

5B. The method of any of Exemplary Embodiments 1B to 4B, wherein at least a portion of the first area substantially free of first microporous material is a plurality of channels.

6B. The method of any of Exemplary Embodiments 1B to 5B, wherein at least a portion of the first area on the major surface of the first gas diffusion layer substantially free of first microporous material is a plurality of connected channels.

7B. The method of Exemplary Embodiments 1B to 6B further comprising removing a portion of first microporous material from the first gas diffusion layer to provide at least one additional area (e.g., a second area; a second area and a third area; a second area, third area, and a fourth area, etc.) on the major surface of the first gas diffusion layer substantially free of the first microporous material.

8B. The method of Exemplary Embodiment 7B, wherein at least a portion of the areas on the major surface of the first gas diffusion layer substantially free of first microporous material is a plurality of unconnected channels.

9B. The method of any of Exemplary Embodiments 1B to 8B, wherein at least a portion of at least one area on the major surface of the first gas diffusion layer substantially free of first microporous material has a width in a range from 1 mm to 10 mm (in some embodiments in a range from 2 mm to 6 mm, or even 3 mm to 5 mm).

10B. The method of any of Exemplary Embodiments 1B to 9B, wherein areas substantially free of first microporous material are collectively in a range 2% to 40% (in some embodiments, 4% to 20%, or even 6% to 15%) of the major surface of the microporous layer.

11B. The method of any of Exemplary Embodiments 1B to 10B, wherein the second gas diffusion layer has a second microporous layer on a major surface thereof, wherein the second microporous layer has a major surface area, wherein the second gas diffusion layer is secured to the cathode catalyst of the catalyst coated membrane by at least:
  removing a portion of the second microporous layer from the second gas diffusion layer to provide at least a first area on the major surface of the second gas diffusion layer substantially free of second microporous material; and
  securing the second gas diffusion layer to the cathode catalyst of the catalyst coated membrane, wherein there is a second adhesive disposed in at least a portion of the first area of the second gas diffusion layer substantially free of second microporous material that at least partially aids in bonding the second gas diffusion layer and the catalyst coated membrane together.

12B. The method of Exemplary Embodiment 10B, wherein removing the portion of the first microporous material from the first gas diffusion layer is done via at least one of laser ablation or mechanical removal.

13B. The method of Exemplary Embodiment 11B, wherein removing the portion of second microporous material from the second gas diffusion layer is done via at least one of laser ablation or adhesive transfer.

14B. The method of any of Exemplary Embodiments 11B to 13B, wherein at least a portion of the second area substantially free of second microporous material is a plurality of channels.

15B. The method of any of Exemplary Embodiments 11B to 13B, wherein at least a portion of the second area on the major surface of the second gas diffusion layer substantially free of second microporous material is a plurality of connected channels.

16B. The method of any of Exemplary Embodiments 11B to 15B, further comprising removing a portion of the second microporous material from the second gas diffusion layer to provide at least one additional area (e.g., a second area; a second area and a third area; a second area, third area, and a fourth area, etc.) on the major surface of the second gas diffusion layer substantially free of the second microporous material.

17B. The method of Exemplary Embodiment 16B, wherein at least a portion of the areas on the major surface of the second gas diffusion layer substantially free of second microporous material is a plurality of unconnected channels.

18B. The method of any of Exemplary Embodiments 11B to 17B, wherein at least a portion of at least one area on the major surface of the second gas diffusion layer substantially free of second microporous material has a width in a range from 1 mm to 10 mm (in some embodiments in a range from 2 mm to 6 mm, or even 3 mm to 5 mm).

19B. The method of any of Exemplary Embodiments 11B to 18B, wherein areas substantially free of second microporous material are collectively in a range of 2% to 40% (in some embodiments, 4% to 20%, or even 6% to 15%) of the major surface of the microporous layer.

1C. A method of making a membrane electrode assembly, the method comprising:
coating a microporous layer onto a first gas diffusion layer on a major surface thereof using at least one mask to provide a first gas diffusion layer having a first microporous layer on a major surface thereof, wherein the first microporous layer has a major surface, and wherein the major surface of the first microporous layer has discontinuous areas therein substantially free of first microporous material, and wherein at least a portion of at least one discontinuous area is in an active area of the first gas diffusion layer;
providing a catalyst coated membrane having first and second generally opposed major surfaces, wherein the first major surface comprises an anode catalyst, and wherein the second major surface comprises a cathode catalyst;
securing the first gas diffusion layer to the anode catalyst of the catalyst coated membrane, wherein there is a first adhesive disposed in at least a portion of the first discontinuous areas of the first gas diffusion layer substantially free of first microporous material that at least partially aids in bonding the first gas diffusion layer and the catalyst coated membrane together; and
securing a second gas diffusion layer to the cathode catalyst of the catalyst coated membrane
to provide the membrane electrode assembly.

2C. The method of Exemplary Embodiment 1C, wherein the second gas diffusion layer is secured to the catalyst coated membrane before the first gas diffusion layer is secured to the catalyst coated membrane.

3C. The method of either of Exemplary Embodiment 1C or 2C, wherein the first gas diffusion layer is secured to the anode catalyst of the catalyst coated membrane, and wherein the second gas diffusion layer is secured to the cathode catalyst of the catalyst coated membrane.

4C. The method of either of Exemplary Embodiment 1C or 2C, wherein the first gas diffusion layer is secured to the cathode catalyst of the catalyst coated membrane, and wherein the second gas diffusion layer is secured to the anode catalyst of the catalyst coated membrane.

5C. The method of any of Exemplary Embodiments 1C to 4C, wherein at least a portion of the first area substantially free of first microporous material is a plurality of channels.

6C. The method of any of Exemplary Embodiments 1C to 4C, wherein at least a portion of the first area on the major surface of the first gas diffusion layer substantially free of first microporous material is a plurality of connected channels.

7C. The method of Exemplary Embodiments 1C to 6C further comprising removing a portion of first microporous material from the first gas diffusion layer to provide at least one additional area (e.g., a second area; a second area and a third area; a second area, third area, and a fourth area, etc.) on the major surface of the first gas diffusion layer substantially free of the first microporous material.

8C. The method of Exemplary Embodiment 7C, wherein at least a portion of the areas on the major surface of the first gas diffusion layer substantially free of first microporous material is a plurality of unconnected channels.

9C. The method of any of Exemplary Embodiments 1C to 8C, wherein at least a portion of at least one area on the major surface of the first gas diffusion layer substantially free of first microporous material has a width in a range from 1 mm to 10 mm (in some embodiments in a range from 2 mm to 6 mm, or even 3 mm to 5 mm).

10C. The method of any of Exemplary Embodiments 1C to 9C, wherein areas substantially free of first microporous material are collectively in a range of 2% to 40% (in some embodiments, 4% to 20%, or even 6% to 15%) of the major surface of the microporous layer.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

Figure 3A:
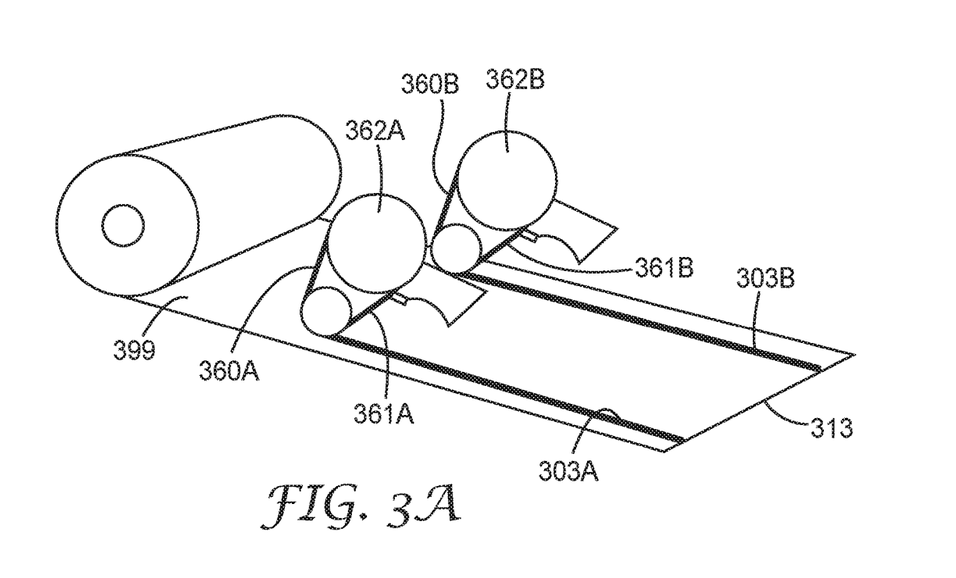
FIGS. 3A and 3B are schematics of an exemplary method of making an exemplary membrane electrode assembly described herein.

The following process was used to remove the microporous layer of a gas diffusion layer and add adhesive for diffusion layer attachment. Referring to FIG. 3A, microporous layer 399 is removed near the edges of gas diffusion layer roll good 313. Removal of a portion of microporous layer 399 from gas diffusion layer 313 was facilitated using adhesive transfer tape 360A, 360B (available under the trade designation "SCOTCH ATG 700 ADHESIVE TRANSFER TAPE" from 3M Company, St. Paul, Minn.) using conventional tape dispensers 362A, 362B to provide channels 303A, 303B. The microporous layer material removed was rewound onto waste liner collection 361A, 361B within the adhesive transfer tape dispensers 362A, 362B.

Figure 3B:
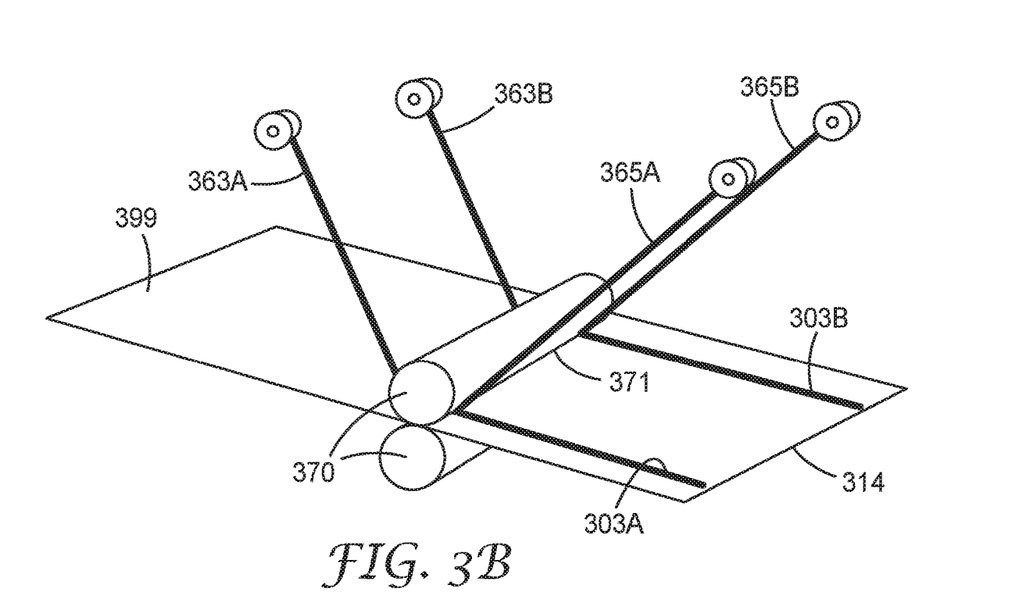

Referring to FIG. 3B, ethylene ethyl acrylate hot melt film 363A, 363B made with resin obtained under the trade designation "DOW EA102" from Dow Chemical Co., Midland, Mich.) coated at a 25 micrometer thickness coated on a release liner was used as the input hot melt adhesive tape to fill channels 303A, 303B. Hot melt adhesive (not shown; between rollers 370) was laminated at 130° C. using hot nip 371. Release liner 365A, 365B was lifted off.

Resulting gas diffusion layer (with adhesive added in channels 303A, 303B) 314 was die cut so that the edge lanes of adhesive channels 303A, 303B matched the edge of catalyst coated membrane 14-16-18 (see FIG. 2). Gas diffusion layers 12 and 19 (see FIGS. 2 and 2A) (gas diffusion layers 314 used for these) were subsequently aligned to membrane 16 bearing catalyst layers 14 and 18 of CCM 14-16-18 (see FIG. 2) and hot bonded to catalyst coated membrane 14-16-18 (see FIG. 2) in a conventional press to form membrane electrode assembly 9 (see FIG. 2).

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A membrane electrode assembly comprising a first gas diffusion layer having a first microporous layer on a major surface thereof, wherein the first microporous layer has a major surface, wherein the major surface of the first microporous layer has discontinuous areas therein substantially free of microporous material, and wherein at least a portion of the first discontinuous areas have adhesive therein and directly in contact with a portion of the first gas diffusion layer adjacent to the respective discontinuous area.

2. The membrane electrode assembly of claim 1, wherein at least a portion of the first discontinuous areas substantially free of microporous material is a plurality of channels.

3. The membrane electrode assembly of claim 1, wherein at least a portion of the first discontinuous areas substantially free of microporous material is a plurality of unconnected channels.

4. The membrane electrode assembly of claim 1, wherein at least a portion of the first discontinuous areas substantially free of microporous material is a plurality of connected channels.

5. The membrane electrode assembly of claim 1, wherein at least some of the first discontinuous areas have a width in a range from 1 mm to 10 mm.

* * * * *